United States Patent
Hwang (10) Patent No.: US 12,369,037 B2
(45) Date of Patent: Jul. 22, 2025

(54) METHOD FOR GUARANTEEING RELIABILITY OF PACKET AND APPARATUS USING THE SAME IN SYNCHRONOUS WIRELESS DISTRIBUTED COMMUNICATION SYSTEM

(71) Applicant: ELECTRONICS AND TELECOMMUNICATIONS RESEARCH INSTITUTE, Daejeon (KR)

(72) Inventor: Hyun-Gu Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 629 days.

(21) Appl. No.: 17/379,506

(22) Filed: Jul. 19, 2021

(65) Prior Publication Data
US 2022/0038910 A1 Feb. 3, 2022

(30) Foreign Application Priority Data

Jul. 31, 2020 (KR) .................. 10-2020-0096030
May 14, 2021 (KR) .................. 10-2021-0062959

(51) Int. Cl.
*H04W 12/60* (2021.01)
*H04B 7/024* (2017.01)
*H04B 7/185* (2006.01)

(52) U.S. Cl.
CPC ............ *H04W 12/66* (2021.01); *H04B 7/024* (2013.01); *H04B 7/18506* (2013.01)

(58) Field of Classification Search
CPC .... H04W 12/66; H04B 7/024; H04B 7/18506
See application file for complete search history.

(56) References Cited

U.S. PATENT DOCUMENTS

| | | | | |
|---|---|---|---|---|
| 5,781,550 A | * | 7/1998 | Templin | H04L 63/0281 726/12 |
| 6,307,837 B1 | * | 10/2001 | Ichikawa | H04L 63/0236 370/230 |

(Continued)

FOREIGN PATENT DOCUMENTS

| | | | | |
|---|---|---|---|---|
| CN | 108702719 A | * | 10/2018 | B64C 39/024 |
| CN | 105873031 B | * | 3/2019 | H04L 9/0631 |

(Continued)

OTHER PUBLICATIONS

Kalyan Kumar Jena,"A Fuzzy Classification Based Trust Model to Aggrandize the Trustworthiness in Unmanned Aerial Vehicle Network (UAVN)", 2019 International Conference on Information Technology (ICIT), 7 pages (Year: 2019).*

(Continued)

*Primary Examiner* — Shahriar Zarrineh
(74) *Attorney, Agent, or Firm* — KILE PARK REED & HOUTTEMAN PLLC (57) ABSTRACT

Disclosed herein are a method for ensuring trustworthiness of a packet in a distributed synchronous wireless communication system and an apparatus using the method. The method, performed by terminals and an apparatus for checking the trustworthiness of a packet, includes: transmitting, by a first terminal, a packet including a trust field to a second terminal using distributed wireless communication; receiving, by a third terminal, the packet from the first terminal; requesting, by the third terminal, checking of trustworthiness by delivering the packet and information about the packet reception time to the apparatus; checking, by the apparatus, the trustworthiness of the packet using the trust field and the information about the packet reception time; generating, by the apparatus, a trust result notification packet when the result of checking the trustworthiness indicates (Continued)

that the packet is untrusted; and transmitting, by the apparatus, the trust result notification packet to the second terminal.

5 Claims, 6 Drawing Sheets

(56) References Cited

U.S. PATENT DOCUMENTS

| | | | |
|---|---|---|---|
| 8,732,464 B2 | 5/2014 | Lai et al. | |
| 9,870,710 B2* | 1/2018 | Song | H04W 4/025 |
| 9,927,807 B1* | 3/2018 | Ganjoo | H04W 4/38 |
| 10,225,723 B1 | 3/2019 | Son et al. | |
| 10,230,450 B2 | 3/2019 | Kim et al. | |
| 10,425,805 B2 | 9/2019 | Nouchet et al. | |
| 2007/0260879 A1* | 11/2007 | Dzung | H04L 63/065 |
| | | | 713/163 |
| 2010/0232503 A1* | 9/2010 | Morimoto | H04W 76/12 |
| | | | 375/E7.243 |
| 2013/0010961 A1* | 1/2013 | Morimoto | H04W 76/12 |
| | | | 370/328 |
| 2013/0145461 A1* | 6/2013 | Barton | H04W 12/12 |
| | | | 726/22 |
| 2014/0111310 A1 | 4/2014 | Bae et al. | |
| 2017/0195826 A1* | 7/2017 | Shaikh | H04L 63/105 |
| 2017/0309191 A1* | 10/2017 | Marcus | G08G 5/0034 |
| 2018/0103036 A1* | 4/2018 | Fox | H04W 4/40 |
| 2018/0222582 A1* | 8/2018 | Ohata | G06T 1/0007 |
| 2019/0103030 A1* | 4/2019 | Banga | G01S 5/0027 |
| 2019/0261171 A1* | 8/2019 | Cozzetti | H04W 12/108 |
| 2020/0207230 A1* | 7/2020 | Evans | H02J 50/10 |
| 2020/0322353 A1* | 10/2020 | Bhandari | H04L 63/1425 |

FOREIGN PATENT DOCUMENTS

| | | | | |
|---|---|---|---|---|
| CN | 210776321 U | * | 6/2020 | |
| CN | 106909167 B | * | 2/2021 | B64D 45/06 |
| JP | 2020123316 A | * | 8/2020 | |
| JP | 2023162230 A | * | 11/2023 | |
| KR | 10-2012-0052404 | | 5/2012 | |
| KR | 20120052404 A | * | 5/2012 | |
| KR | 10-2015-0129601 | | 11/2015 | |
| KR | 10-2018-0058667 | | 6/2018 | |
| KR | 2018058666 A | * | 6/2018 | H04W 28/18 |
| KR | 10-2019-0101305 | | 8/2019 | |
| KR | 10-2072152 | | 2/2020 | |
| KR | 20200079180 A | * | 7/2020 | |
| WO | WO-2018006262 A1 | * | 1/2018 | B64C 39/024 |
| WO | WO-2019164328 A1 | * | 8/2019 | H04W 28/18 |

OTHER PUBLICATIONS

Vikas Hassija, "Fast, Reliable, and Secure Drone Communication: A Comprehensive Survey" IEEE Communications Surveys & Tutorials, vol. 23, No. 4, Fourth Quarter 2021, 31 pages (Year: 2021).*
Abhishek Sharma, "Communication and networking technologies for UAVs", Journal of Network and Computer Applications vol. 168, Oct. 15, 2020, 102739 , 18 pages (Year: 2020).*
Mirmojtaba Gharibi, "Internet of Drones", Published in: IEEE Access ( vol. 4), Published in: IEEE Access ( vol. 4), pp. 1148-1162 (Year: 2016).*

* cited by examiner

METHOD FOR GUARANTEEING RELIABILITY OF PACKET AND APPARATUS USING THE SAME IN SYNCHRONOUS WIRELESS DISTRIBUTED COMMUNICATION SYSTEM

CROSS REFERENCE TO RELATED APPLICATIONS

This application claims the benefit of Korean Patent Application No. 10-2020-0096030, filed Jul. 31, 2020, and No. 10-2021-0062959, filed May 14, 2021, which are hereby incorporated by reference in their entireties into this application.

BACKGROUND OF THE INVENTION

1. Technical Field

The present invention relates generally to distributed synchronous wireless communication technology, and more particularly to technology for ensuring trustworthiness of packets transmitted and received in a distributed synchronous wireless communication system.

2. Description of the Related Art

Disclosed herein are open trust communication, an open trust packet, and an open trust field. An open trust packet is a distributed wireless communication packet, and includes an open trust field for checking the trustworthiness of the packet. Here, communication performed using such open trust packets is referred to as open trust communication.

Open trust communication is used for distributed wireless communication. One example thereof is communication between drones. In many countries, drones have to broadcast the locations thereof during flight. This is because a ground control system needs to carefully manage flying drones and because drones need to recognize each other. Here, what matters is the fact that an illicit drone may transmit a fake signal. For example, an illicit drone receiving a packet from another drone may illegally use information contained in the packet. This problem arises from the condition in which it must be possible for a packet transmitted by one drone to be received by other drones in the vicinity thereof such that drones become aware of location information pertaining to each other. For example, airplanes are forced to mandatorily transmit an ADS-B packet in almost every country, and the ADS-B packet contains the address thereof and location information pertaining thereto, and no cryptography is applied thereto. If cryptography is applied to a packet, other airplanes may be unable to interpret the packet, so it is impossible to acquire location information pertaining to each other.

Meanwhile, Korean Patent Application Publication No. 10-2018-0058667, titled "Method for setting and using terminal address in distributed wireless communication system" discloses a method for identifying and setting addresses of a mobile communication terminal, a ship terminal, a vehicle terminal, a drone terminal, a fixed terminal, and household appliance terminals in a synchronized distributed wireless communication environment in which large-scale connections are required.

However, in the method disclosed in Korean Patent Application Publication No. 10-2018-0058667, terminals are not able to check whether packets received from each other are trusted. Accordingly, if an illicit drone with a malicious purpose sends a path change signal to a target drone, the target drone may face a risk, for example, it may be hijacked or wrecked, or may collide with another object. Accordingly, a method for ensuring the trustworthiness of packets sent and received by terminals is required when the terminals perform communication in a one-to-one manner.

SUMMARY OF THE INVENTION

An object of the present invention is to check whether packets transmitted and received between terminals in a distributed synchronous wireless communication environment are trusted.

Another object of the present invention is to provide an environment in which terminals are able to trust each other by checking the trustworthiness of packets.

In order to accomplish the above objects, a method for ensuring trustworthiness of a packet, performed by terminals and an apparatus for checking trustworthiness of a packet, in a distributed synchronous wireless communication system according to an embodiment of the present invention includes: transmitting, by a first terminal, a packet including a trust field to a second terminal using distributed wireless communication; receiving, by a third terminal, the packet from the first terminal; requesting, by the third terminal, checking of trustworthiness by delivering the packet and information about the time at which the packet is received to the apparatus; checking, by the apparatus, the trustworthiness of the packet using the trust field included in the packet and the information about the time at which the packet is received; generating, by the apparatus, a trust result notification packet corresponding to the result of checking the trustworthiness; and transmitting, by the apparatus, the trust result notification packet to the second terminal.

Here, generating the trust result notification packet may be configured to generate the trust result notification packet including information about the result of checking the trustworthiness of the packet, the address of the second terminal, and a trust field based on which the second terminal is able to check trustworthiness.

Here, the trust result notification packet may further include at least one of the address of the first terminal, information about the time at which the first terminal transmits the packet to the second terminal, and information about the time at which the trust field is generated.

Here, transmitting the trust result notification packet may include delivering, by the apparatus, the trust result notification packet to a fourth terminal; and transmitting, by the fourth terminal, the trust result notification packet to the second terminal using distributed synchronous wireless communication.

Here, the method may further include, after transmitting the trust result notification packet, checking, by the second terminal receiving the trust result notification packet, the trustworthiness of the received trust result notification packet.

Here, the fourth terminal may correspond to the third terminal.

Here, generating the trust result notification packet may be configured such that the fourth terminal generates the trust field using information about a preset time at which the trust result notification packet is arranged to be transmitted to the second terminal.

Here, generating the trust result notification packet may be configured such that the third terminal generates the trust field using the information about the time at which the packet is received.

Here, generating the trust result notification packet may be configured to generate the trust field at an arbitrary time and to include time information about the arbitrary time, at which the trust field is generated, in the trust result notification packet.

Also, in order to accomplish the above objects, a method for ensuring trustworthiness of a packet, performed by terminals and an apparatus for checking trustworthiness of a packet, in a distributed synchronous wireless communication system according to an embodiment of the present invention includes: transmitting, by a first terminal, a packet including a trust field to a second terminal using distributed wireless communication; transmitting, by the second terminal, a trust inquiry packet, which is used to request checking of trustworthiness of the packet received from the first terminal, to a third terminal using distributed wireless communication; requesting, by the third terminal, the apparatus to check the trustworthiness of the packet by delivering the trust inquiry packet to the apparatus; checking, by the apparatus, the trustworthiness of the packet; transmitting, by the apparatus, a trust response packet, corresponding to the result of checking the trustworthiness, to the third terminal; transmitting, by the third terminal, the trust response packet to the second terminal; and confirming, by the second terminal, the result of checking the trustworthiness by receiving the trust response packet.

Here, the trust inquiry packet may include at least one of the address of the first terminal, which is a source address, the address of the second terminal, which is a destination address, a data field, a trust field, and information about the time at which the packet is received.

Here, transmitting the trust inquiry packet may be configured such that the second terminal transmits the trust inquiry packet to the third terminal using any one of mobile communication, Wi-Fi, Bluetooth, and drone control communication, in place of the distributed wireless communication.

Here, checking the trustworthiness may be configured such that the apparatus checks the trustworthiness of the trust inquiry packet and such that the apparatus checks the trustworthiness of the packet only when it is determined that the trust inquiry packet is trusted.

Here, requesting the apparatus to check the trustworthiness may be configured such that the third terminal transmits the trust inquiry packet and information about the time at which the trust inquiry packet is received by the third terminal to the apparatus.

Here, checking the trustworthiness may be configured such that the apparatus checks the trustworthiness of the trust inquiry packet using the information about the time at which the trust inquiry packet is received by the third terminal.

Here, transmitting the trust response packet to the second terminal may include delivering, by the apparatus, the trust response packet including the result of checking the trustworthiness to the third terminal; and transmitting, by the third terminal, the trust response packet to the second terminal.

Here, the trust response packet may include at least one of the result of checking the trustworthiness of the packet, the address of the second terminal, information about the time at which the third terminal receives the trust inquiry packet, a trust field based on which the second terminal checks the trustworthiness of the trust response packet, and time information that is used in order to generate the trust field.

Here, confirming the result of checking the trustworthiness may be configured such that the second terminal checks the trustworthiness of the trust response packet and such that the second terminal determines that the result of checking the trustworthiness of the packet, which is included in the trust response packet, is valid only when the result of checking the trustworthiness of the trust response packet indicates that the trust response packet is trusted.

Here, confirming the result of checking the trustworthiness may be configured such that the second terminal checks the trustworthiness of the trust response packet using a trust field included in the trust response packet and time information that is used in order to generate the trust field.

Also, in order to accomplish the above objects, an apparatus using a method for ensuring trustworthiness of a packet includes one or more processors and executable memory for storing at least one program executed by the one or more processors. In a distributed synchronous wireless communication system, when a first terminal transmits a packet including a trust field to a second terminal using distributed wireless communication and when a third terminal receives the packet from the first terminal, the at least one program is configured to receive a request to check trustworthiness of the packet by receiving information about the time at which the packet is received and the packet from the third terminal, to check the trustworthiness of the packet using the trust field included in the packet and the information about the time at which the packet is received, to generate a check notification packet corresponding to the result of checking the trustworthiness, and to transmit the check notification packet to the second terminal.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains.

Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Because the present invention may be variously changed and may have various embodiments, specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the teachings of the present invention. Similarly, a second element could also be referred to as a first element. The term "and/or" includes a combination of multiple disclosed elements associated with each other or any one thereof.

It will be understood that, when an element is referred to as being "connected" or "coupled" to another element, it can be directly connected or coupled to the other element, or intervening elements may be present. Conversely, it will be understood that, when an element is referred to as being "directly connected" or "directly coupled" to another element, there are no intervening elements therebetween.

The terms used in the present specification are used merely to describe specific embodiments, and are not intended to limit the present invention. A singular expression includes the plural meaning, unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, a preferred embodiment of the present invention will be described in detail with reference to the accompanying drawings. In the following description of the present invention, the same reference numerals are used to designate the same or similar elements throughout the drawings, and repeated descriptions of the same components will be omitted.

In the present specification, when the term "open trust communication", "open trust packet", or "open trust field" is used, "open" will be omitted hereinbelow for convenience of description.

Hereinafter, a preferred embodiment of the present invention will be described in detail with reference to the accompanying drawings.

Figure 1:
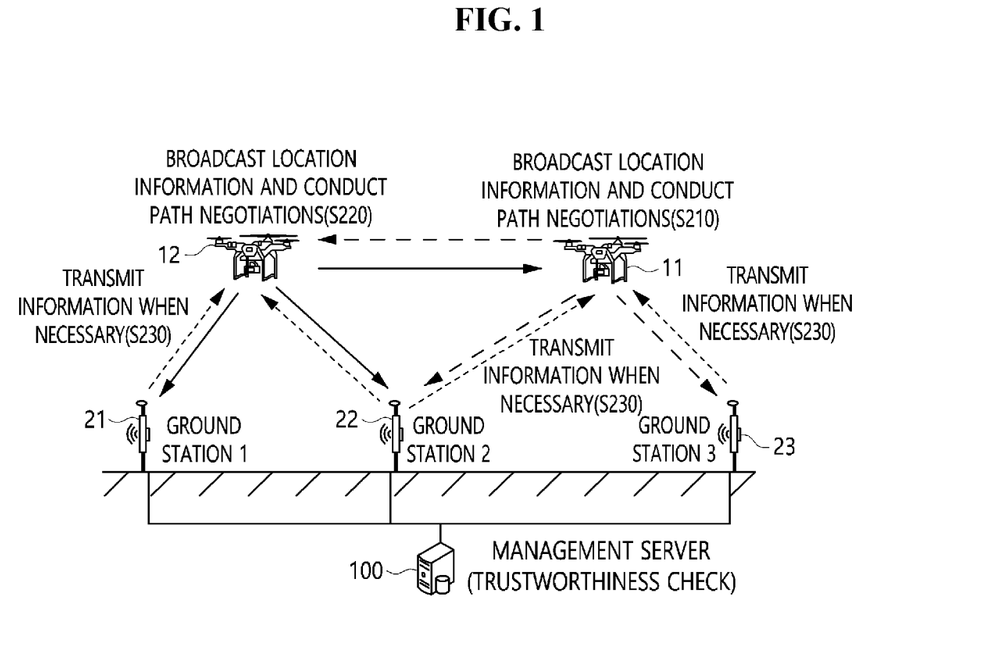
FIG. 1 is a view illustrating a distributed synchronous wireless communication environment according to an embodiment of the present invention.

FIG. 1 is a view illustrating a distributed synchronous wireless communication environment according to an embodiment of the present invention.

Referring to FIG. 1, the distributed synchronous wireless communication environment according to an embodiment of the present invention may include multiple terminals 11 and 12, multiple ground stations 21, 22 and 23, and a management server 100. Here, the apparatus for checking the trustworthiness of a packet according to an embodiment of the present invention may be the management server 100.

Here, the apparatus for checking the trustworthiness of a packet may be an apparatus that uses a method for ensuring the trustworthiness of a packet.

The ground stations 21, 22 and 23 may be connected to the management server 100 using a wired communication means, and the management server 100 may receive packets that the ground stations 21, 22 and 23 receive from the terminals 11 and 12, and may check the trustworthiness thereof.

In the present invention, the terminals 11 and 12 may be drones. The terminals 11 and 12 may transmit and receive broadcast packets or unicast packets, which are transmitted and received in a one-to-one manner, at steps S210 and S220.

Here, the drones 11 and 12 may broadcast information about the locations thereof using broadcast packets, and may communicate with each other in a one-to-one manner when necessary. A prime example of such a one-to-one communication service is path negotiations between drones.

Here, the first drone 11 may request the second drone 12 to negotiate therewith about their paths.

Particularly, when it is expected that they will collide with each other, the drones 11 and 12 may negotiate with each other about the flight paths thereof by sending and receiving unicast packets.

Here, the distributed synchronous wireless packets transmitted by the drones 11 and 12 may also be received by the ground stations 21, 22 and 23 in the vicinity thereof at step S230.

That is, in the distributed synchronous wireless communication environment, a broadcast packet and a unicast packet may be received by all nearby terminals 11 and 12. Here, the broadcast packet does not include a specific destination address, but the unicast packet may include a specific destination address.

For example, a request for path negotiations may be made in order to conduct negotiations about waiting for a certain time until another drone passes, passing with precedence, and the like. Such path negotiations require that the drones trust each other, but the drones themselves are not able to check whether the counterpart is trusted. Accordingly, the apparatus 100 for checking the trustworthiness of a packet according to an embodiment of the present invention automatically checks the trustworthiness of path negotiations included in the unicast packets received by the ground stations 21, 22 and 23, thereby ensuring the trustworthiness of the terminals 11 and 12.

Here, unicast packets include a trust field, and may be received by all nearby wireless terminals.

Here, all of the terminals that receive a unicast packet may check the value of an open trust field included in the unicast packet, but are not able to check the trustworthiness of the received unicast packet using the trust field. However, the apparatus 100 for checking the trustworthiness of a packet according to an embodiment of the present invention may check the trustworthiness of the packet received from the terminal by checking the trust field, and may insert a trust field into the packet to be transmitted to a specific terminal such that only the specific terminal is able to check the trustworthiness of the packet based on the inserted trust field.

For example, the drone management system on the ground, corresponding to the apparatus 100 for checking the trustworthiness of a packet, may check whether a distributed synchronous wireless packet transmitted by a flying drone is trusted. Also, the trustworthiness of a distributed synchronous wireless packet transmitted to a specific terminal by the drone management system on the ground may be checked only by the specific terminal. As described above, a terminal and the apparatus for checking the trustworthiness of a packet may check the trustworthiness of each other, but terminals are not able to check the trustworthiness of each other.

Particularly, a trust field of a packet has a characteristic in that it cannot be copied. That is, because the trust field has a value that changes in each slot time, when an illicit drone receives a packet, the trust field may be applied only to the packet that has been received in the previous slot time.

For example, when an illicit drone copies a trust field and transmits a packet containing the same to another drone, the apparatus 100 for checking the trustworthiness of a packet receives the packet via a ground station and checks the trustworthiness of the packet, thereby becoming aware that the packet is not trusted.

As described above, the operation whereby the value of a trust field changes over time is essential because a packet transmitted using distributed wireless communication may be received by all nearby users. Because the trust field of a unicast packet used in an embodiment of the present invention has a value that changes based not only on the time but also on the value of transmitted data, it has a characteristic in that it is very robust to hacking. Due to this characteristic of the trust field, even though a second terminal confirms that a packet transmitted by a first terminal at a certain time is trusted, the second terminal is not able to also trust another packet transmitted by the first terminal at another time in a distributed wireless communication environment. This is because there is no method for verifying whether the corresponding packet was actually transmitted from the first terminal in the distributed wireless communication environment.

Particularly, the terminals 11 and 12 are not able to check the trustworthiness of packets received from each other.

For example, when two flying drones conduct negotiations about the paths thereof in order to avoid a collision therebetween, the second drone is not able to check whether a packet sent by the first drone is trusted. Accordingly, if an illicit drone with a malicious purpose sends a path change signal to a target drone, the target drone may encounter a risk; for example, it may be hijacked or wrecked, or may collide with another object. In the present invention, whether packets transmitted and received by terminals are trusted may be checked, and the result of checking is returned, whereby the trustworthiness of the terminals may be ensured.

Figure 2:
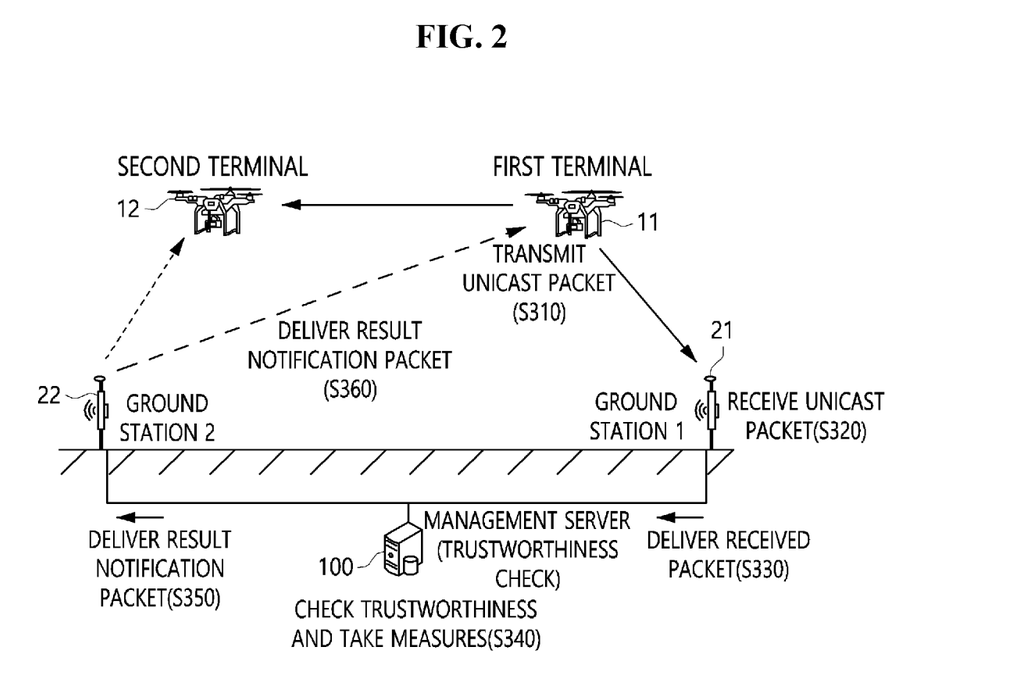
FIG. 2 is a view illustrating a process in which the trustworthiness of a packet is automatically checked according to an embodiment of the present invention.

FIG. 2 is a view illustrating a process in which the trustworthiness of a packet is automatically checked according to an embodiment of the present invention.

Referring to FIG. 2, it can be seen that a process in which trustworthiness of a packet is automatically checked is illustrated.

First, a first terminal 11 may transmit a packet to a second terminal 12 at step S310. That is, the source address of the packet is the address of the first terminal 11, and the destination address thereof is the address of the second terminal 12. Here, the packet may be, for example, a path negotiation packet transmitted and received between the first terminal 11 and the second terminal 12.

A first ground station 21 may determine whether to automatically check the trustworthiness of the packet based on the source address and the destination address of the packet received from the first terminal 11.

Here, when the source address and the destination address of the received packet are respectively the address of the first terminal 11 and the address of the second terminal 12, the first ground station 21 may request an apparatus 100 for checking the trustworthiness of a packet to perform an automatic check at step S330 in order to check whether the packet is trusted.

Here, the wireless packet may also be received by the first ground station 21 at step S320. Here, the first ground station 21 may be a third terminal.

Here, the first ground station 21 may deliver the received path negotiation packet to the apparatus 100 for checking the trustworthiness of a packet without change, and may simultaneously deliver information about the time at which the path negotiation packet is received.

Here, the packet may include a packet header, a source address, a destination address, a data field, a trust field, and the like.

Here, the trust field may have a specific value according to a specific time.

Here, the data field may include content about path negotiations.

Here, the source address may be the address of the first terminal 11, and the destination address may be the address of the second terminal 12.

The apparatus 100 for checking the trustworthiness of a packet may check whether the received path negotiation packet is trusted at step S340.

Here, the apparatus 100 for checking the trustworthiness of a packet may check the trustworthiness of the packet using the packet and the information about the time at which the packet is received, which are delivered by the first ground station 21.

Here, the apparatus 100 for checking the trustworthiness of a packet calculates the value of the trust field using the time information, and compares the same with the value of the trust field included in the packet, thereby checking the trustworthiness thereof.

Here, the apparatus 100 for checking the trustworthiness of a packet may generate a trust result notification packet, which includes information about the result of checking the trustworthiness of the packet, the address of the second terminal, and a trust field based on which the second terminal 12 is able to check trustworthiness.

Here, the trust result notification packet may further include at least one of the address of the first terminal 11, information about the time at which the first terminal 11 transmitted the packet to the second terminal 12, and information about the time at which the trust field was generated.

The apparatus 100 for checking the trustworthiness of a packet may deliver the trust result notification packet, containing the result of checking the trustworthiness, to a second ground station 22 at step S350. Here, the second ground station 22 may be a fourth terminal.

Here, the second ground station 22 may deliver the trust result notification packet to the second terminal 12 at step S360.

Here, the apparatus 100 for checking the trustworthiness of a packet may alternatively deliver the trust result notification packet, containing the result of checking the trustworthiness, to the first ground station 21 at step S350.

In this case, the first ground station 21 may deliver the trust result notification packet to the second terminal 12 at step S360.

The apparatus 100 for checking the trustworthiness of a packet may take measures depending on the result of checking the trustworthiness.

That is, when it is determined that the packet is trusted, the apparatus 100 for checking the trustworthiness of a packet may take no special measure, and only when it is determined that the packet is not trusted may the apparatus 100 for checking the trustworthiness of a packet generate a trust result notification packet and transmit the same to the second terminal 12 via the second ground station 22.

Here, the trust result notification packet may include information about the trustworthiness check result. The information about the trustworthiness check result may include either 'trusted' or 'not trusted'.

Here, when the result of checking the trustworthiness of the packet indicates that the packet is 'trusted', the apparatus 100 for checking the trustworthiness of a packet may take no measure, as described above, or may transmit a trust result notification packet, including a trustworthiness check result indicating that the packet is 'trusted', to the second terminal 12.

Here, when the trustworthiness check result indicates that the packet is 'not trusted', the apparatus 100 for checking the trustworthiness of a packet may transmit a trust result notification packet, including information indicating that the packet sent by the first terminal 11 is not trusted, to the second terminal 12, which corresponds to the destination address identified from the packet, via the second ground station 22.

That is, it can be seen that the ground station receiving the packet transmitted by the first terminal 11 is the first ground station 21, but the ground station transmitting the trust result notification packet to the second terminal 12 is the second ground station 22.

The second ground station 22 may transmit the trust result notification packet to the second terminal 12 using distributed wireless communication.

Here, the second ground station 22 may generate the trust field using information about a preset time at which the trust result notification packet is arranged to be transmitted to the second terminal 12.

The trust result notification packet may include a packet header, a source address, a destination address, a data field, a trust field, and the like. Here, the trust field is a trust field based on which only the second terminal is able to check the trustworthiness of the trust result notification packet.

For example, when the source address of the trust result notification packet is the address of the second ground station 22, the destination address thereof may be the address of the second terminal 12, and the data field thereof may include information about the trustworthiness check result.

The information about the trustworthiness check result may include the address of the terminal that transmitted the packet, the trustworthiness of which is being checked, namely, the address of the first terminal 11, and information about the time at which the first ground station 21 received the packet, the trustworthiness of which is being checked, from the first terminal.

The trust field may provide information that is required in order for the second terminal 12, which receives the trust result notification packet, to check whether the trust result notification packet is trusted.

Here, the second terminal 12 may check whether the trust result notification packet is trusted using the information included in the trust field of the trust result notification packet.

The first terminal 11 may also receive the trust result notification packet, but is not able to check whether the trust result notification packet is trusted. This is because the trust field included in the trust result notification packet is generated using a trust check secret key possessed by the second terminal.

Here, because distributed wireless communication resources may be unavailable at the arranged time depending on the communication environment, the ground station may not transmit the trust result notification packet to the terminal correctly at the arranged time.

In order to solve the above problem, the apparatus 100 for checking the trustworthiness of a packet may generate a trust field using information about the time at which the packet of the first terminal 11 is received by the first ground station 21, and may include information about the time at which the trust field is generated in the trust result notification packet.

Accordingly, the second terminal 12 may check whether the trust result notification packet is trusted using the information about the time at which the first ground station 21 received the packet from the first terminal 11, which is included in the trust result notification packet.

Also, the apparatus 100 for checking the trustworthiness of a packet may include the time information, which is used to generate the trust field, in the trust result notification packet.

Accordingly, the second terminal 12 may check whether the trust result notification packet is trusted using the time information that is used to generate the trust field, which is included in the trust result notification packet. Here, the time information used to generate the trust field may be randomly selected.

Here, because the trust field is generated so as to have a value that changes over time, the apparatus 100 for checking the trustworthiness of a packet and the second terminal 12 may generate identical values for the trust field when the same time information is given.

Accordingly, the second terminal 12 generates a value of the trust field using the time information included in the trust result notification packet and compares the same with the trust field included in the trust result notification packet, thereby checking whether the trust result notification packet is trusted.

Also, the apparatus 100 for checking the trustworthiness of a packet may encrypt the data field of the trust result notification packet to be transmitted to the second terminal 12. Here, the first terminal 11 is not able to receive the trust result notification packet, the data field of which is encrypted. Various cryptography techniques may be used to encrypt the data field, but this is beyond the scope of the present invention.

Figure 3:
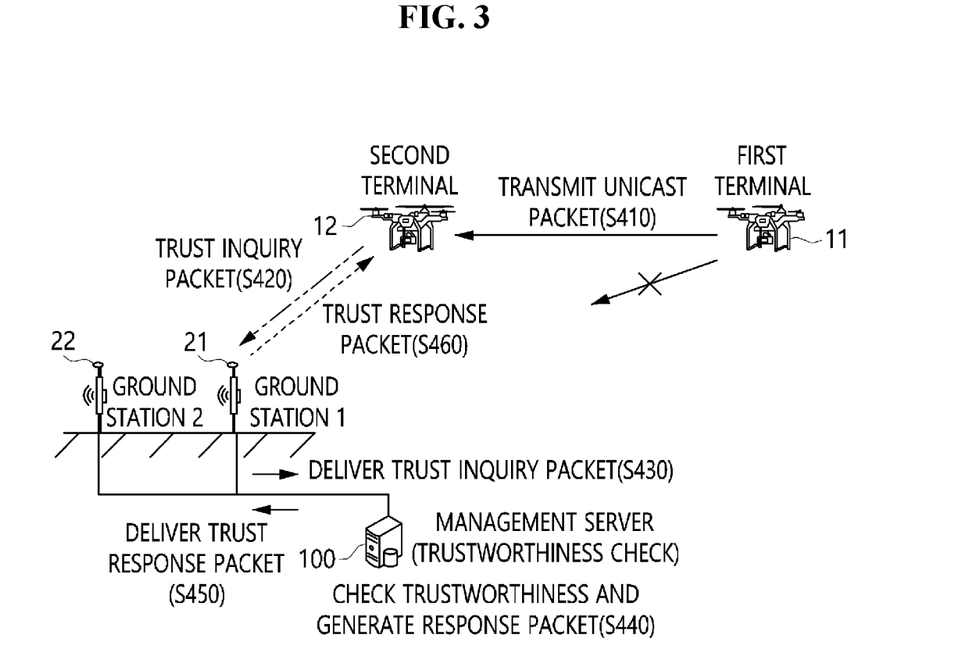
FIG. 3 is a view illustrating a process in which checking of trustworthiness is manually performed using a trust inquiry packet according to an embodiment of the present invention.
Figure 4:
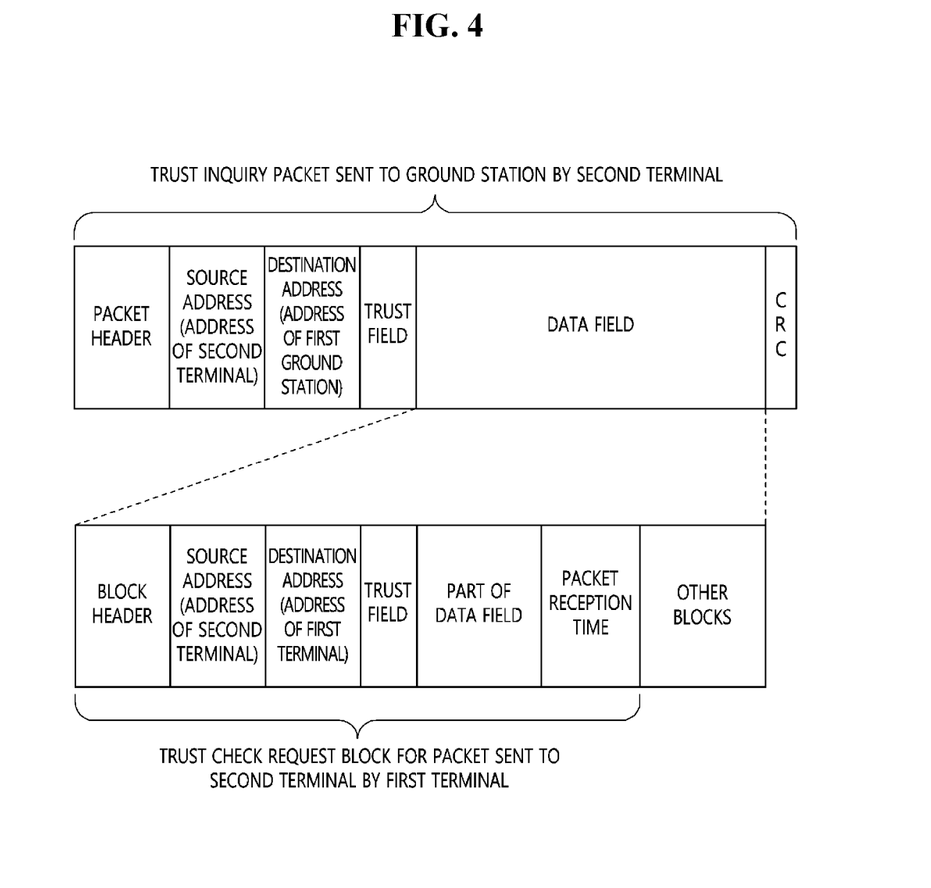
FIG. 4 is a view illustrating the structure of a trust inquiry packet according to an embodiment of the present invention.

FIG. 3 is a view illustrating a process in which checking of trustworthiness is manually performed using a trust inquiry packet according to an embodiment of the present invention. FIG. 4 is a view illustrating the structure of a trust inquiry packet according to an embodiment of the present invention.

Referring to FIG. 3, the process of manually checking trustworthiness, which is performed when automatic checking of trustworthiness described in FIG. 2 is impossible, is illustrated. As illustrated in FIG. 3, only some terminals are within the coverage area monitored by a ground station, and a first ground station 21 may not be able to receive a path negotiation packet transmitted from a first terminal 11 to a second terminal 12.

Particularly, drones flying over the sea, not far from the land, may be in this state, and may be easily exposed to risks because it is difficult to automatically check trustworthiness. Accordingly, drones in such an environment may request a ground station to check whether a packet received thereby is trusted when necessary.

An apparatus 100 for checking the trustworthiness of a packet may cover multiple ground stations and multiple terminals, but some of the terminals may be out of the area checked by the ground stations.

First, a second terminal 12 may receive a unicast packet from a first terminal 11 at step S410. The second terminal 12 may transmit a trust inquiry packet for the unicast packet, which is received from the first terminal 11, to a first ground station 21 using distributed synchronous wireless communication at step S420.

Here, rather than using the distributed wireless communication, the second terminal 12 may use any one of mobile communication, Wi-Fi, Bluetooth, and drone control communication in order to transmit the trust inquiry packet to the first ground station 21.

However, when the trust inquiry packet is transmitted using a communication means other than distributed wireless communication, the method for ensuring the trustworthiness of the trust inquiry packet itself has to be provided based on the communication means that is used.

The second terminal 12 may deliver the trust inquiry packet to the first ground station using distributed synchronous wireless communication.

Referring to FIG. 4, the trust inquiry packet may include a source address, a destination address, a data field including a trust check request block, and a trust field.

The source address is the address of the second terminal 12, the destination address is the address of the first ground station 21, and the trust field contains a trust value for the trust inquiry packet itself.

The data field may include information about the packet received from the first terminal 11 and trustworthiness check request information.

As illustrated in FIG. 4, the block header may contain the trustworthiness check request information. Also, it can be seen that information about the packet received by the second terminal 12 from the first terminal 11 is added to the block header, whereby the trust check request block is formed.

Here, the trust check request block may include the address of the second terminal 12, which is a source address, the address of the first terminal 11, which is a destination address, a trust field, a part of a data field, information about the time at which the second terminal 12 received the packet from the first terminal 11, and the like.

Here, the trust field may have a value that changes depending on the value of the data field and the transmission time.

The first ground station 21 checks whether a trust check request block is present in the data field of the received packet, thereby checking whether the received packet is a trust inquiry packet.

Here, when the received packet is determined to be a trust inquiry packet, the first ground station 21 may request the apparatus 100 for checking the trustworthiness of a packet to perform a manual trustworthiness check through which whether the packet included in the data field of the trust inquiry packet is trusted is checked.

The first ground station 21 may deliver the received trust inquiry packet to the apparatus 100 for checking the trustworthiness of a packet at step S430.

Here, when it receives the trust inquiry packet using distributed synchronous wireless communication, the first ground station 21 may also deliver information about the time at which the trust inquiry packet is received to the apparatus 100 for checking the trustworthiness of a packet.

The apparatus 100 for checking the trustworthiness of a packet may check whether the packet, a trustworthiness check of which is requested using the trust inquiry packet received from the first ground station 21, is trusted at step S440.

The data field of the trust inquiry packet may include information about the packet, the trustworthiness check of which is requested.

The information about the packet may include the source address of the packet, the destination address thereof, a part of the data field thereof, the trust field thereof, information about the time at which the packet was received, and the like.

When the trust inquiry packet is delivered to the first ground station 21 using distributed synchronous wireless communication, the apparatus 100 for checking the trustworthiness of a packet may check whether the trust inquiry packet is trusted, and may then check whether the packet, the trustworthiness check of which is requested using the trust inquiry packet, is trusted only when it is determined that the trust inquiry packet is trusted.

Here, the apparatus 100 for checking the trustworthiness of a packet may check whether the trust inquiry packet itself is trusted using the information about the time at which the trust inquiry packet is received, the information being received from the first ground station 21.

Here, the apparatus 100 for checking the trustworthiness of a packet calculates the value of the trust field using the information about the time at which the trust inquiry packet is received and compares the same with the value of the trust field included in the trust inquiry packet, thereby checking the trustworthiness thereof.

When the trust inquiry packet does not pass the trustworthiness check, the apparatus 100 for checking the trustworthiness of a packet may ignore the request to check the trustworthiness of the packet, which is made using the trust inquiry packet.

The apparatus 100 for checking the trustworthiness of a packet may deliver a trust response packet including trustworthiness check result information, corresponding to the result of the trustworthiness check requested using the trust inquiry packet, to the first ground station 21 at step S450.

The apparatus 100 for checking the trustworthiness of a packet may calculate the value of the trust field included in the data field of the trust inquiry packet using the information about the time at which the packet is received, which is included in the data field of the trust inquiry packet.

Here, the apparatus 100 for checking the trustworthiness of a packet compares the calculated value with the value of the trust field included in the data field, thereby checking whether the packet, the trustworthiness check of which is requested using the trust inquiry packet, is trusted.

Also, the apparatus 100 for checking the trustworthiness of a packet may generate a trust response packet including the trustworthiness check result information corresponding to the result of checking the trustworthiness of the packet, the trustworthiness check of which is requested using the trust inquiry packet.

Here, the trust response packet may include the address of the second terminal 12, a data field, a trust field, and the like. Here, the trust field is a trust field required in order for the second terminal 12 to check trustworthiness.

The data field may include the trustworthiness check result information.

The trustworthiness check result information may include the address of the first terminal 11, which transmits the packet, information about the time at which the first ground station 21 receives the trust inquiry packet from the second terminal 12, a result value indicative of 'trusted' or 'not trusted', and the like.

The trust field may be used when the second terminal 12 receiving the trust response packet checks the trustworthiness of the trust response packet.

Because the value of the trust field continuously changes over time, the apparatus 100 for checking the trustworthiness of a packet may set the time at which the first ground station 21 is to transmit the trust response packet, and may deliver the trust response packet including a trust field, the value of which is calculated based on the set transmission time, to the first ground station 21.

Here, because distributed wireless communication resources may be unavailable at the set time depending on the communication environment, the ground station may not transmit the trust response packet to the terminal correctly at the set time.

In order to solve the above problem, the apparatus 100 for checking the trustworthiness of a packet may generate the trust field using information about the time at which the first ground station 21 received the trust inquiry packet from the second terminal 12, and may include information about the time at which the trust field is generated in the trust response packet.

Accordingly, the second terminal 12 may check whether the trust response packet is trusted using the information about the time at which the first ground station 21 received the trust inquiry packet, which is included in the trust response packet.

Also, the apparatus 100 for checking the trustworthiness of a packet may include the time information that is used to generate the trust field in the trust response packet. Here, the time information used to generate the trust field may be time information randomly selected by the apparatus 100 for checking the trustworthiness of a packet.

Here, the trust field is generated so as to have a value that changes over time, and the apparatus 100 for checking the trustworthiness of a packet and the second terminal 12 may generate identical values for the trust field when the same time information is given.

Also, the apparatus 100 for checking the trustworthiness of a packet may encrypt the data field of the trust response packet to be transmitted to the second terminal 12. Various cryptography techniques may be used to encrypt the data field, but this does not fall within the scope of the present invention.

The first ground station 21 may transmit the trust response packet, which is received from the apparatus 100 for checking the trustworthiness of a packet, to the second terminal 12, which transmitted the trust inquiry packet, using distributed wireless communication at step S460.

Here, the first ground station 21 may set the source address of the received trust response packet to the address thereof, and may then transmit the trust response packet.

The second terminal 12 receives the trust response packet, thereby confirming the result of checking the trustworthiness of the packet, the trustworthiness check of which is requested thereby.

Here, the second terminal 12 may check whether the trust response packet is trusted using the trust field of the trust response packet and the information about the time at which the trust field is generated.

As described above, the second terminal 12 needs to check whether the received trust response packet is trusted. This is because an illicit terminal may also transmit a trust response packet in the distributed synchronous wireless communication environment.

Accordingly, the second terminal 12 may check whether the trust response packet is trusted using the trust field of the trust response packet and the information about the time at which the trust field is generated.

Generally, a ground station and a terminal may exchange packets using distributed synchronous wireless communication. However, the ground station and the terminal may use another communication method when exchanging packets. That is, the ground station and the terminal may exchange packets using any of various wireless communication means, such as mobile communication, Wi-Fi, Bluetooth, drone control communication, and the like. When a communication means other than distributed synchronous wireless communication is used, the trustworthiness of a trust inquiry packet or a trust response packet may be checked using a special cryptographic technique.

Also, communication between a ground station and the apparatus for checking the trustworthiness of a packet may generally be performed using a wired communication means, e.g., a dedicated private cable network, or over the Internet, but another method may also be used. For example, a drone terminal may be controlled by a controller on the ground through drone control communication. Accordingly, a drone may deliver a request to check the trustworthiness of a packet, transmitted by another drone, to the controller on the ground through drone control communication, and the controller on the ground may request the trustworthiness check pertaining to the packet using a mobile communication network.

Figure 5:
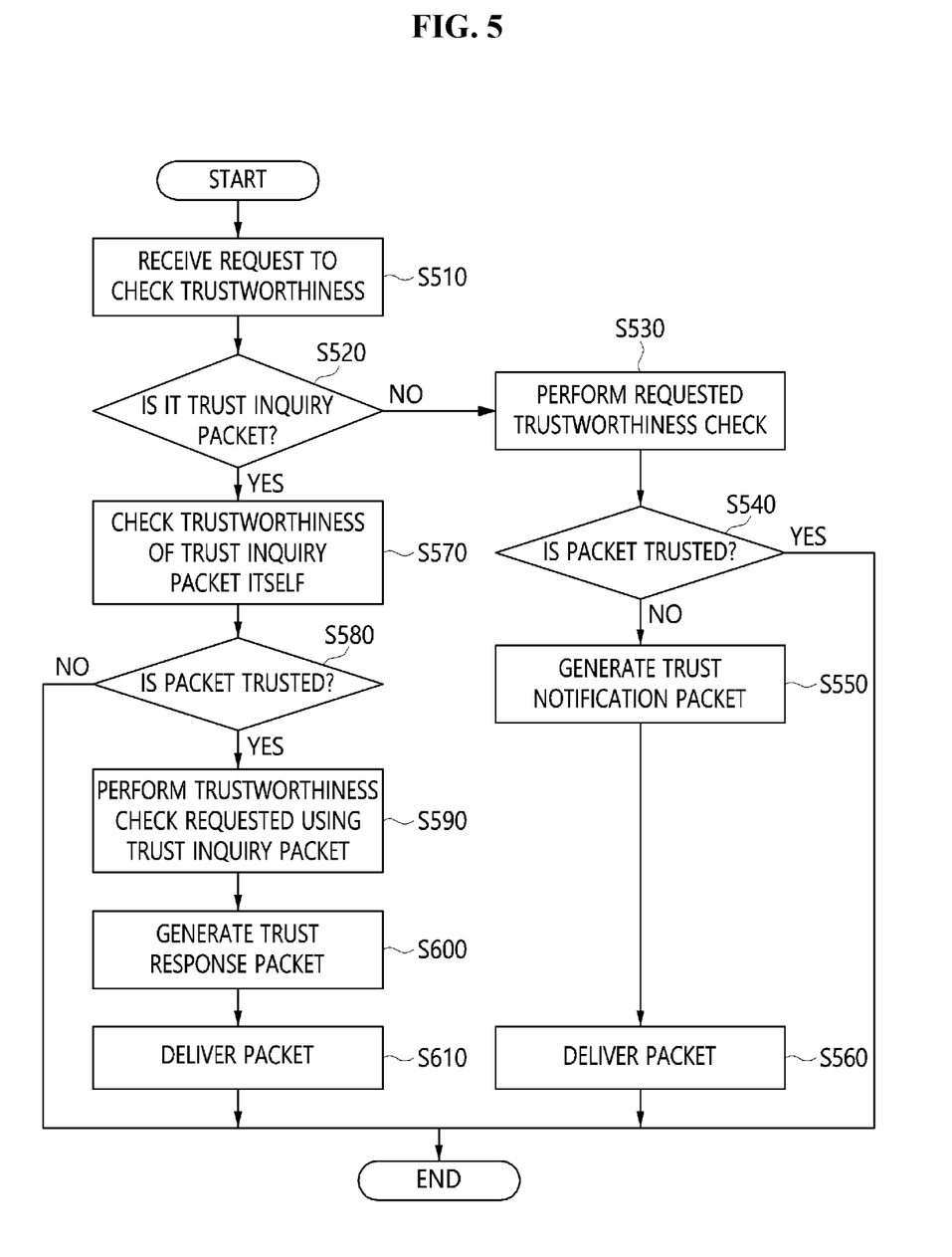
FIG. 5 is a flowchart illustrating a method for ensuring the trustworthiness of a packet according to an embodiment of the present invention.

FIG. 5 is a flowchart illustrating a method for ensuring the trustworthiness of a packet according to an embodiment of the present invention.

Referring to FIG. 5, in the method for ensuring the trustworthiness of a packet according to an embodiment of the present invention, first, a request to check trustworthiness may be received at step S510.

That is, at step S510, a first ground station 21 may receive a packet from a terminal, and may receive a request to check the trustworthiness of the packet.

Here, at step S510, the first ground station 21 may receive the request to check the trustworthiness by receiving the packet, transmitted and received between a first terminal 11 and a second terminal 12, from the first terminal 11 (or by eavesdropping upon the same).

Here, at step S510, the second terminal 12 receives the packet from the first terminal 11, and the first ground station 21 receives a trust inquiry packet, which is used to request checking of the trustworthiness of the packet, from the second terminal, thereby receiving a request to check the trustworthiness of the packet.

Also, in the method for ensuring the trustworthiness of a packet according to an embodiment of the present invention, whether or not the received packet is a trust inquiry packet may be determined at step S520.

That is, at step S520, the first ground station 21 may determine whether the received packet is a trust inquiry packet by checking whether the data field of the received packet includes a trust inquiry block.

Here, when it is determined at step S520 that the first ground station 21 has received a general packet, rather than a trust inquiry packet, the first ground station 21 may request an apparatus 100 for checking the trustworthiness of a packet to perform an automatic trustworthiness check in order to check whether the packet itself is trusted at step S530.

On the other hand, when it is determined at step S520 that the first ground station 21 receives a trust inquiry packet, the first ground station 21 may request the apparatus 100 for checking the trustworthiness of a packet to perform a manual trustworthiness check in order to check whether the packet included in the data field of the trust inquiry packet is trusted at step S570.

Here, at step S520, the first ground station 21 may deliver information about the time at which it received the packet to the apparatus 100 for checking the trustworthiness of a packet.

Also, in the method for the ensuring the trustworthiness of a packet according to an embodiment of the present invention, the requested trustworthiness check may be performed at step S530.

Here, at step S530, the apparatus 100 for checking the trustworthiness of a packet may perform a trustworthiness check using the packet delivered from the first ground station 21 and the information about the time at which the first ground station 21 received the packet.

Here, at step S530, the apparatus 100 for checking the trustworthiness of a packet calculates the value of the trust field using the information about the time at which the first ground station 21 received the packet and compares the same with the value of the trust field included in the packet, thereby checking the trustworthiness.

Here, the packet may include a packet header, a source address, a destination address, a data field, a trust field, and the like.

Here, the trust field may have a specific value according to a specific time.

Here, the data field may include content about path negotiations.

Here, the source address may be the address of the first terminal 11, and the destination address may be the address of the second terminal 12.

Also, in the method for ensuring the trustworthiness of a packet according to an embodiment of the present invention, the result of checking the trustworthiness of the packet may be determined at step S540.

That is, at step S540, when the result of checking the trustworthiness of the packet indicates that the packet is trusted, the apparatus 100 for checking the trustworthiness of a packet may generate a trust result notification packet at step S550, whereas the procedure may be terminated when the result of checking the trustworthiness of the packet indicates that the packet is not trusted.

Alternatively, at step S540, when the result of checking the trustworthiness of the packet indicates that the packet is 'trusted', the apparatus 100 for checking the trustworthiness of a packet may take no measures, whereas when the result of checking the trustworthiness of the packet indicates that the packet is 'not trusted', the apparatus 100 for checking the trustworthiness of a packet may generate a trust result notification packet.

Also, in the method for ensuring the trustworthiness of a packet according to an embodiment of the present invention, a trust result notification packet may be generated at step S550.

That is, at step S550, the apparatus 100 for checking the trustworthiness of a packet may generate a trust result notification packet including information about the result of checking the trustworthiness of the packet, the address of the second terminal, and a trust field based on which the second terminal 12 is able to check trustworthiness.

Here, at step S550, the information about the result of checking the trustworthiness may include information indicating that the result of checking the trustworthiness of the packet indicates that the packet is 'not trusted'.

Here, the trust result notification packet may further include at least one of the address of the first terminal 11, information about the time at which the first terminal 11 transmitted the packet to the second terminal 12, and information about the time at which the trust field was generated.

Also, in the method for ensuring the trustworthiness of a packet according to an embodiment of the present invention, the trust result notification packet may be delivered to the second terminal 12 at step S560.

That is, at step S560, the apparatus 100 for checking the trustworthiness of a packet may deliver the generated trust result notification packet to the first ground station 21 or to a second ground station 22. Here, the second ground station 22 may be a fourth terminal.

Here at step S560, the first ground station 21 or the second ground station 22 may deliver the trust result notification packet to the second terminal 12.

That is, the ground station receiving the packet transmitted by the first terminal 11 is the first ground station 21, but the ground station transmitting the trust result notification packet to the second terminal 12 may be the second ground station 22. That is, when the second ground station 22 is located closer to the second terminal 12 than the first ground station 21, the second ground station 22 may transmit the trust result notification packet.

Here, at step S560, the first ground station 21 or the second ground station 22 may generate the trust field using information about a preset time at which the trust result notification packet is arranged to be transmitted to the second terminal 12.

The trust result notification packet may include a packet header, a source address, a destination address, a data field, a trust field, and the like. Here, the trust field is a trust field based on which only the second terminal 12 is able to check trustworthiness.

For example, the source address of the trust result notification packet may be the address of the first ground station 21 or the address of the second ground station 22, the destination address thereof may be the address of the second terminal 12, and the data field thereof may include trustworthiness check result information.

The trustworthiness check result information may include the address of the first terminal 11, which transmitted the packet, the trustworthiness of which is being checked, information about the time at which the first ground station 21 received the packet from the first terminal 11, and the like.

The trust field may provide information that is required in order for the second terminal 12 receiving the trust result notification packet to check whether the trust result notification packet is trusted.

Here, at step S560, the second terminal 12 may check whether the trust result notification packet is trusted using the information included in the trust field of the trust result notification packet.

Here, at step S560, the first terminal 11 may also receive the trust result notification packet, but is not able to check the trustworthiness thereof. This is because the trust field included in the trust result notification packet is generated using a trust check secret key possessed by the second terminal 12.

Here, the trust field has a characteristic in that the value thereof continuously changes according to time, and the apparatus 100 for checking the trustworthiness of a packet may set the time at which the second ground station 22 is to transmit the trust result notification packet, and may deliver the trust result notification packet including a trust field, the value of which is calculated based on the set transmission time, to the second ground station 22.

Here, because distributed wireless communication resources may be unavailable at the set time depending on the communication environment, the ground station may not transmit the trust result notification packet to the terminal correctly at the set time.

In order to solve the above problem, the apparatus 100 for checking the trustworthiness of a packet may generate a trust field using information about the time at which the packet of the first terminal 11 is received by the first ground station 21, and may include information about the time at which the trust field is generated in the trust result notification packet at step S550.

Accordingly, at step S560, the second terminal 12 may check whether the trust result notification packet is trusted using the information about the time at which the first ground station 21 receives the packet of the first terminal 11, the information being included in the trust result notification packet.

Also, at step S550, the apparatus 100 for checking the trustworthiness of a packet may include the time information used for generation of the trust field in the trust result notification packet.

Here, because the trust field is generated so as to have a value that changes over time, the apparatus 100 for checking the trustworthiness of a packet and the second terminal 12 are able to generate identical values for the trust field when the same time information is given.

Also, at step S550, the apparatus 100 for checking the trustworthiness of a packet may encrypt the data field of the trust result notification packet to be transmitted to the second terminal 12. Here, the first terminal 11 is not able to receive the trust result notification packet in which the data field thereof is encrypted. Various cryptography techniques may be used to encrypt the data field, but this is outside the scope of the present invention.

Also, in the method for ensuring the trustworthiness of a packet according to an embodiment of the present invention, whether the trust inquiry packet is trusted may be checked at step S570.

That is, at step S570, the apparatus 100 for checking the trustworthiness of a packet may check whether the trust inquiry packet itself is trusted using information about the time at which the trust inquiry packet is received, the information being received from the first ground station 21.

Here, at step S570, the apparatus 100 for checking the trustworthiness of a packet calculates the value of the trust field using the information about the time at which the trust inquiry packet is received and compares the same with the value of the trust field included in the trust inquiry packet, thereby checking the trustworthiness.

Also, in the method for ensuring the trustworthiness of a packet according to an embodiment of the present invention, the result of checking the trustworthiness of the trust inquiry packet itself may be determined at step S580.

That is, at step S580, when the result of checking the trustworthiness of the trust inquiry packet itself indicates that the trust inquiry packet is trusted, the apparatus 100 for checking the trustworthiness of a packet may check whether the packet, the trustworthiness check of which is requested using the trust inquiry packet, is trusted at step S590, whereas when the result of checking the trustworthiness of the trust inquiry packet indicates that the trust inquiry packet is not trusted, the procedure may be terminated.

Also, in the method for ensuring the trustworthiness of a packet according to an embodiment of the present invention, whether the packet, the trustworthiness check of which is requested using the trust inquiry packet, is trusted may be checked at step S590.

The data field of the trust inquiry packet may include information about the packet, the trustworthiness check of which is requested.

The information about the packet may include the source address of the packet, the destination address thereof, a part of the data field thereof, the trust field thereof, information about the time at which the packet is received, and the like.

That is, at step S590, using the information about the time at which the packet is received, which is included in the data field of the trust inquiry packet, the value of the trust field included in the data field of the trust inquiry packet may be calculated.

Here, at step S590, the calculated value is compared with the value of the trust field included in the data field, whereby whether the packet, the trustworthiness check of which is requested using the trust inquiry packet, is trusted may be checked.

Also, in the method for ensuring the trustworthiness of a packet according to an embodiment of the present invention, a trust response packet may be generated at step S600.

That is, at step S600, the apparatus 100 for checking the trustworthiness of a packet may generate a trust response packet including trustworthiness check result information corresponding to the result of checking the trustworthiness of the packet, the trustworthiness check of which is requested using the trust inquiry packet.

Here, the trust response packet may include the address of the second terminal 12, a data field, a trust field, and the like. Here, the trust field is a trust field based on which the second terminal 12 checks trustworthiness.

The data field may include the trustworthiness check result information.

The trustworthiness check result information may include the address of the first terminal 11, which transmitted the packet, information about the time at which the first ground station 21 receives the trust inquiry packet from the second terminal 12, a result value indicative of 'trusted' or 'not trusted', and the like.

The trust field may be used in order for the second terminal 12 receiving the trust response packet to check the trustworthiness of the trust response packet.

Because the trust field has a value that continuously changes over time, the apparatus 100 for checking the trustworthiness of a packet may set the time at which the first ground station 21 is to transmit the trust response packet, and may deliver the trust response packet including the trust field, the value of which is calculated based on the set transmission time, to the first ground station 21 at step S600.

Here, because distributed wireless communication resources may be unavailable at the set time depending on the communication environment, the ground station may not transmit the trust response packet to the terminal correctly at the set time.

In order to solve the above problem, the apparatus 100 for checking the trustworthiness of a packet may generate a trust field using information about the time at which the trust inquiry packet of the second terminal 12 is received by the first ground station 21, and may include the information about the time at which the trust field is generated in the trust response packet at step S600.

Accordingly, the second terminal 12 may check the trustworthiness of the trust response packet using the information about the time at which the first ground station 21 receives the trust inquiry packet, which is included in the trust response packet.

Also, at step S600, the apparatus 100 for checking the trustworthiness of a packet may include the time information used for generation of the trust field in the trust response packet. Here, the time information used for the generation of the trust field may be time information that is randomly selected by the apparatus 100 for checking the trustworthiness of a packet.

Here, the trust field is generated so as to have a value that changes over time, and the apparatus 100 for checking the trustworthiness of a packet and the second terminal 12 are able to generate identical values for the trust field when the same time information is given.

Also, at step S600, the apparatus 100 for checking the trustworthiness of a packet may encrypt the data field of the trust response packet to be transmitted to the second terminal 12. Various cryptography techniques may be used to encrypt the data field, but this falls outside the scope of the present invention.

Here, at step 600, the apparatus 100 for checking the trustworthiness of a packet may deliver the trust response packet including the trustworthiness check result information to the first ground station 21.

Also, in the method for ensuring the trustworthiness of a packet according to an embodiment of the present invention, the trust response packet may be delivered to the second terminal at step S610.

That is, at step S610, the first ground station 21 receiving the trust response packet may transmit the trust response packet to the second terminal 12, which transmitted the trust inquiry packet, using distributed wireless communication.

Here, at step S610, the first ground station 21 sets the source address of the received trust response packet to the address thereof, and then transmits the trust response packet to the second terminal 12.

Here, at step S610, the second terminal 12 receives the trust response packet, thereby being notified of the result of checking the trustworthiness of the packet, the trustworthiness check of which is requested thereby.

As described above, the second terminal 12 needs to check the trustworthiness of the received trust response packet. This is because an illicit terminal may also transmit a trust response packet in a distributed synchronous wireless communication environment.

Accordingly, at step S610, the second terminal 12 may check whether the trust response packet is trusted using the trust field of the trust response packet and information about the time at which the trust field is generated.

Figure 6:
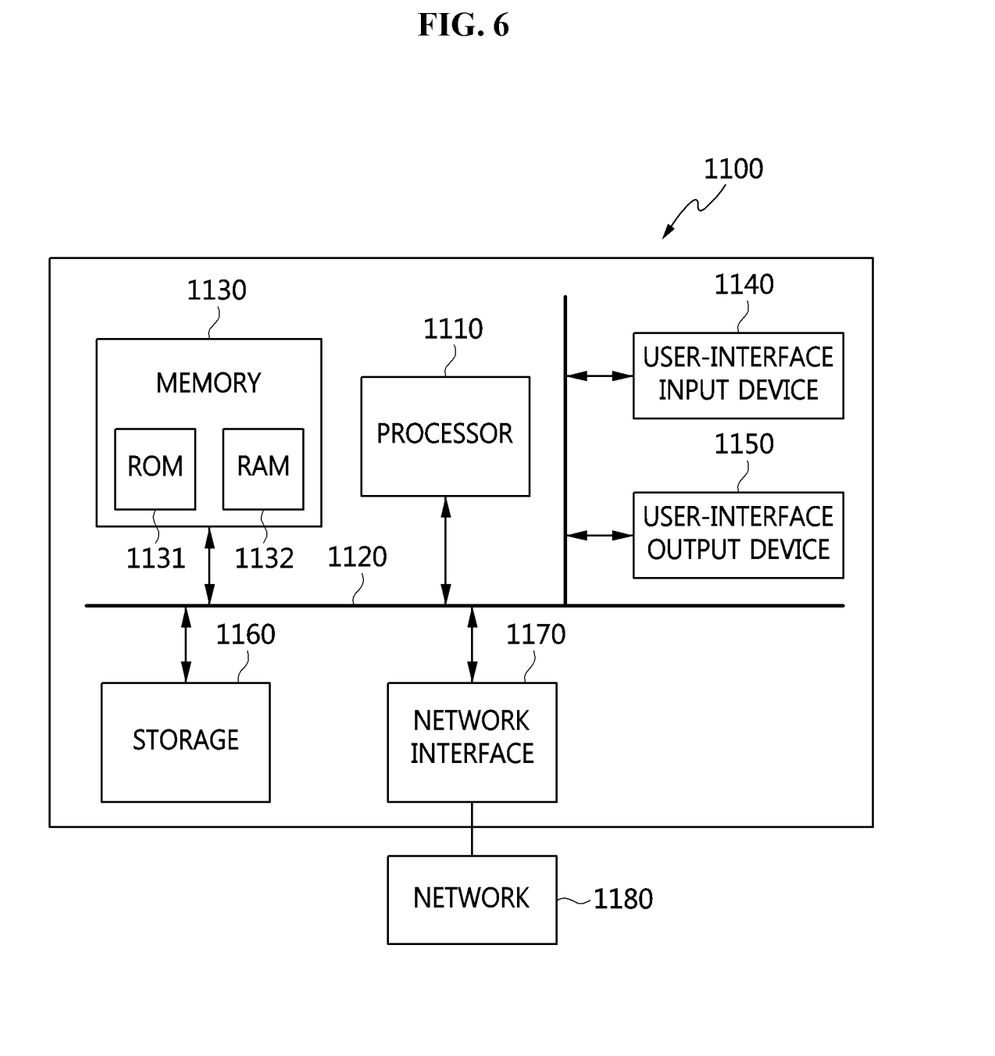
FIG. 6 is a view illustrating a computer system according to an embodiment of the present invention.

FIG. 6 is a view illustrating a computer system according to an embodiment of the present invention.

Referring to FIG. 6, the apparatus 100 for checking the trustworthiness of a packet according to an embodiment of the present invention may be implemented in a computer system 1100 including a computer-readable recording medium. As illustrated in FIG. 6, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for checking the trustworthiness of a packet according to an embodiment of the present invention includes one or more processors 1110 and executable memory 1130 for storing at least one program executed by the one or more processors 1110. In a distributed synchronous wireless communication system, when a first terminal transmits a packet including a trust field to a second terminal using distributed wireless communication and when a third terminal receives the packet from the first terminal, the at least one program receives a request to check the trustworthiness of the packet by receiving information about the time at which the packet is received and the packet from the third terminal, checks the trustworthiness of the packet using the trust field included in the packet and the information about the time at which the packet is received, generates a trust result notification packet corresponding to the result of checking the trustworthiness, and transmits the trust result notification packet to the second terminal.

Here, the at least one program may generate a trust result notification packet including information about the result of checking the trustworthiness of the packet, the address of the second terminal, and a trust field based on which the second terminal is able to check trustworthiness.

Here, the trust result notification packet may further include at least one of the address of the first terminal, information about the time at which the first terminal transmitted the packet to the second terminal, and information about the time at which the trust field was generated.

Here, the at least one program may deliver the trust result notification packet to a fourth terminal, and the fourth terminal may transmit the trust result notification packet to the second terminal using distributed synchronous wireless communication.

Here, upon receiving the trust result notification packet, the second terminal may check the trustworthiness of the received trust result notification packet.

Here, the fourth terminal may correspond to the third terminal.

Here, the fourth terminal may generate the trust field using information about a preset time at which the trust result notification packet is arranged to be transmitted to the second terminal.

Here, the third terminal may generate the trust field using information about the time at which the packet is received.

Here, the at least one program may generate the trust field at an arbitrary time, and may include time information about the arbitrary time at which the trust field is generated in the trust result notification packet.

Also, the apparatus for checking the trustworthiness of a packet according to an embodiment of the present invention includes one or more processors 1110 and executable memory 1130 for storing at least one program executed by the one or more processors 1110. In a distributed synchronous wireless communication system, a first terminal transmits a packet including a trust field to a second terminal using distributed wireless communication, the second terminal transmits a trust inquiry packet, which is used to request checking of the trustworthiness of the packet received from the first terminal, to a third terminal using distributed wireless communication, the third terminal requests checking of the trustworthiness of the packet by delivering the trust inquiry packet to the apparatus, the at least one program checks the trustworthiness of the packet and transmits a trust response packet corresponding to the result of checking the trustworthiness to the third terminal, the third terminal transmits the trust response packet to the second terminal, and the second terminal receives the trust response packet and confirms the result of checking the trustworthiness.

Here, the data field of the trust inquiry packet may include a part of the packet transmitted by the first terminal and information about the time at which this packet was received. Here, the part of the packet transmitted by the first terminal may include the address of the first terminal, which is the source address of the packet, the address of the second terminal, which is the destination address of the packet, a portion of the data field of the packet, the trust field thereof, and the like.

Here, the second terminal may transmit the trust inquiry packet to the third terminal using any one of mobile communication, Wi-Fi, Bluetooth, and drone control communication, in place of distributed synchronous wireless communication.

Here, the at least one program may check the trustworthiness of the trust inquiry packet, and may check whether the packet is trusted only when it is determined that the trust inquiry packet is trusted.

Here, the third terminal may transmit the trust inquiry packet and information about the time at which the trust inquiry packet was received to the apparatus.

Here, the at least one program may check the trustworthiness of the trust inquiry packet using the information about the time at which the trust inquiry packet was received.

Here, the at least one program may deliver the trust response packet including the result of checking the trustworthiness to the third terminal, and the third terminal may transmit the trust response packet to the second terminal.

Here, the trust response packet may include at least one of the result of checking the trustworthiness of the packet, the address of the second terminal, information about the time at which the third terminal received the trust inquiry packet, a trust field based on which the second terminal checks the trustworthiness of the trust response packet, and time information used to generate the trust field.

Here, the second terminal may check the trustworthiness of the trust response packet, and may determine that the result of checking the trustworthiness of the packet, which is included in the trust response packet, is valid only when the result of checking the trustworthiness of the trust response packet indicates that the trust response packet is trusted.

Here, the second terminal may check the trustworthiness of the trust response packet using the trust field included in the trust response packet and the time information used to generate the trust field.

According to the present invention, the trustworthiness of packets transmitted and received between terminals in a distributed synchronous wireless communication environment may be checked.

Also, the present invention may provide an environment in which terminals are able to trust each other by checking the trustworthiness of packets.

As described above, the apparatus and method for checking the trustworthiness of a packet according to the present invention are not limitedly applied to the configurations and operations of the above-described embodiments, but all or some of the embodiments may be selectively combined and configured, so that the embodiments may be modified in various ways.

What is claimed is:

1. A method for ensuring trustworthiness of a packet received by a second terminal from a first terminal by using a third terminal and a fourth terminal communicating with an apparatus for checking trustworthiness of a packet, in a distributed synchronous wireless communication system, the method comprising:

transmitting, by a first terminal, a path negotiation packet including a trust field to a second terminal and a third terminal using distributed wireless communication, the second terminal to thereafter receive a trust result notification packet corresponding to the path negotiation packet;

receiving, by the third terminal, the path negotiation packet from the first terminal;

requesting, by the third terminal, checking of trustworthiness by delivering the path negotiation packet and information about a time at which the path negotiation packet is received by the third terminal to the apparatus, wherein the first terminal and the second terminal are drones,
the third terminal and the fourth terminal are ground stations,
the first terminal is closer to the third terminal than the fourth terminal, and
the second terminal is closer to the fourth terminal than the third terminal, checking, by the apparatus, trustworthiness of the path negotiation packet using the trust field included in the path negotiation packet and the information about the time at which the path negotiation packet is received, wherein the checking of the trustworthiness of the path negotiation packet comprises:

calculating, by the apparatus, a calculated value corresponding to a value of the trust field using the information about the time at which the path negotiation packet is received by the third terminal, and comparing the calculated value with the value of the trust field; and generating, by the apparatus, a trust result notification packet when a result of checking the trustworthiness indicates that the packet is not trusted; and transmitting, by the fourth terminal, the trust result notification packet to the second terminal to prevent the second terminal from trusting the path negotiation packet received from the first terminal.

2. The method of claim 1, wherein the generating of the trust result notification packet includes generating the trust result notification packet to include information about a result of the checking of the trustworthiness of the path negotiation packet, an address of the second terminal, and a trust result notification packet trust field based.

3. The method of claim 2, wherein the trust result notification packet further includes at least one of an address of the first terminal, information about a time at which the first terminal transmitted the packet to the second terminal, and information about a time at which the trust result notification packet trust field is generated.

4. The method of claim 2, wherein the transmitting of the trust result notification packet comprises:
   delivering, by the apparatus, the trust result notification packet to the fourth terminal; and
   transmitting, by the fourth terminal, the trust result notification packet to the second terminal using distributed synchronous wireless communication.

5. An apparatus using a method for ensuring trustworthiness of a packet received by a second terminal from a first terminal by using a third terminal and a fourth terminal communicating with the apparatus, the apparatus comprising:
   one or more processors; and
   executable memory for storing at least one program executed by the one or more processors,
   wherein the at least one program is configured to,
   when a first terminal transmits a path negotiation packet including a trust field to a second terminal and a third terminal using distributed wireless communication in a distributed synchronous wireless communication system and when the third terminal receives the packet from the first terminal,
   receive a request to check trustworthiness of the packet by receiving information about a time at which the path negotiation packet is received by the third terminal and the path negotiation packet from the third terminal,
   check the trustworthiness of the path negotiation packet using the trust field included in the path negotiation packet and the information about the time at which the path negotiation packet is received,
   generate a trust result notification packet when a result of checking the trustworthiness indicates that the path negotiation packet is not trusted, and
   transmit the trust result notification packet to the fourth terminal, wherein
   the fourth terminal transmits the trust result notification to the second terminal to prevent the second terminal from trusting the packet received from the first terminal,
   the first terminal and the second terminal are drones,
   the third terminal and the fourth terminal are ground stations,
   the first terminal is closer to the third terminal than the fourth terminal, and
   the second terminal is closer to the fourth terminal than the third terminal,
   the at least one program is further configured to:
      calculate a calculated value corresponding to a value of the trust field using the information about the time at which the path negotiation packet is received by the third terminal, and comparing the calculated value with the value of the trust field.

* * * * *